(12) United States Patent
Arai et al.

(10) Patent No.: US 7,324,889 B2
(45) Date of Patent: Jan. 29, 2008

(54) INTAKE-AIR QUANTITY CONTROL SYSTEM OF ENGINE

(75) Inventors: Masahiro Arai, Yokohama (JP);
Takahiro Yoshino, Kanagawa (JP);
Hidekazu Yoshizawa, Gumma (JP);
Hirokazu Shimizu, Gumma (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/723,284

(22) Filed: Mar. 19, 2007

(65) Prior Publication Data
US 2007/0219704 A1 Sep. 20, 2007

(30) Foreign Application Priority Data
Mar. 20, 2006 (JP) ............................. 2006-076866

(51) Int. Cl.
*B60T 7/12* (2006.01)
*F02D 41/00* (2006.01)
(52) U.S. Cl. ...................... 701/103; 123/674; 123/681; 123/321
(58) Field of Classification Search ................ 701/103, 701/104, 105, 114, 115; 123/434, 435, 321, 123/674, 681, 406.47, 406.23, 339.16, 350, 123/345–348

See application file for complete search history.

(56) References Cited

U.S. PATENT DOCUMENTS

| | | | | |
|---|---|---|---|---|
| 6,055,476 A | * | 4/2000 | Yoshino | 701/110 |
| 6,089,206 A | * | 7/2000 | Suzuki et al. | 123/295 |
| 6,142,117 A | * | 11/2000 | Hori et al. | 123/295 |
| 6,164,254 A | | 12/2000 | Koch et al. | |
| 6,971,367 B2 | * | 12/2005 | Satou et al. | 123/350 |
| 2006/0070605 A1 | * | 4/2006 | Akihisa et al. | 123/478 |
| 2006/0112942 A1 | * | 6/2006 | Katoh | 123/681 |
| 2006/0207550 A1 | | 9/2006 | Saito et al. | |

FOREIGN PATENT DOCUMENTS

| | | |
|---|---|---|
| EP | 1 106 792 A2 | 6/2001 |
| EP | 1 431 548 A2 | 6/2004 |
| JP | 2002-256905 A | 9/2002 |
| WO | WO 2004/109079 A1 | 12/2004 |
| WO | WO 2006/085445 A1 | 8/2006 |

\* cited by examiner

*Primary Examiner*—John T. Kwon
(74) *Attorney, Agent, or Firm*—Foley & Lardner LLP

(57) ABSTRACT

In an intake-air quantity control system of an engine employing a variable valve operating device capable of controlling a cylinder intake-air quantity by variable control of an operating characteristic of an intake valve, in a normal intake-valve operating mode a target operating characteristic of the intake valve is determined based on a target cylinder intake-air quantity calculated based on a target engine torque. In a predetermined high-load range, in particular, at full-load operation, the target operating characteristic is switched to a high-load period valve operating characteristic, preset to be suitable for the predetermined high-load range.

10 Claims, 10 Drawing Sheets

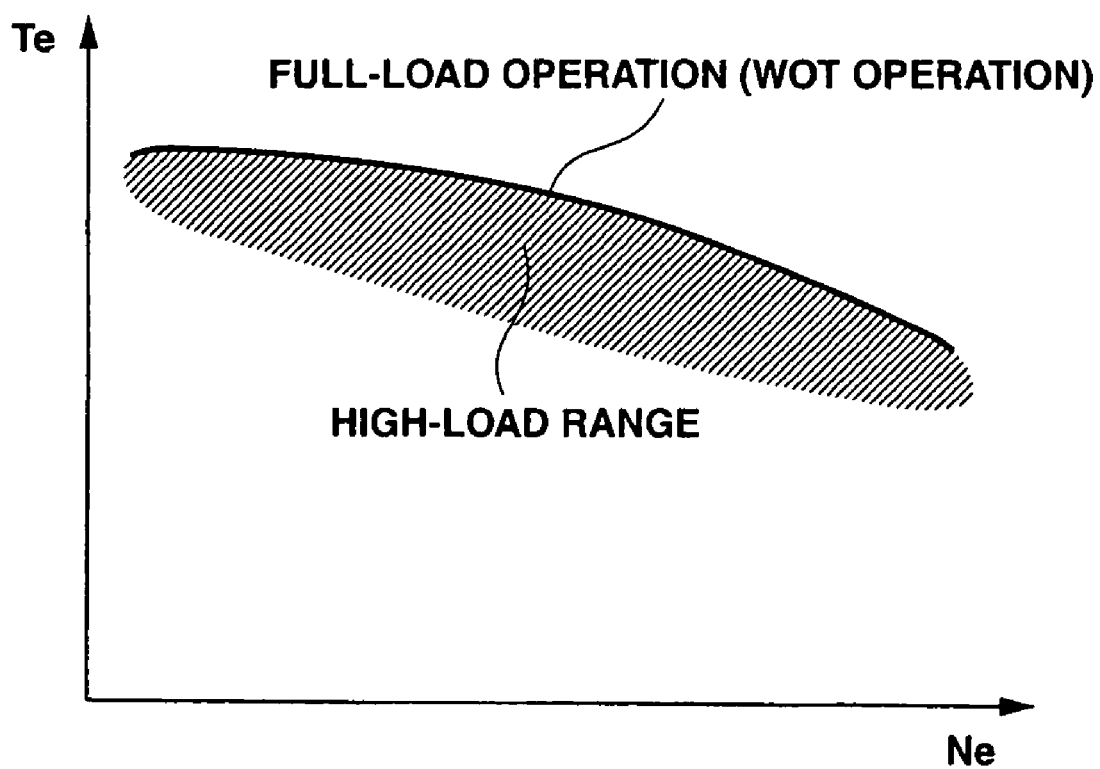

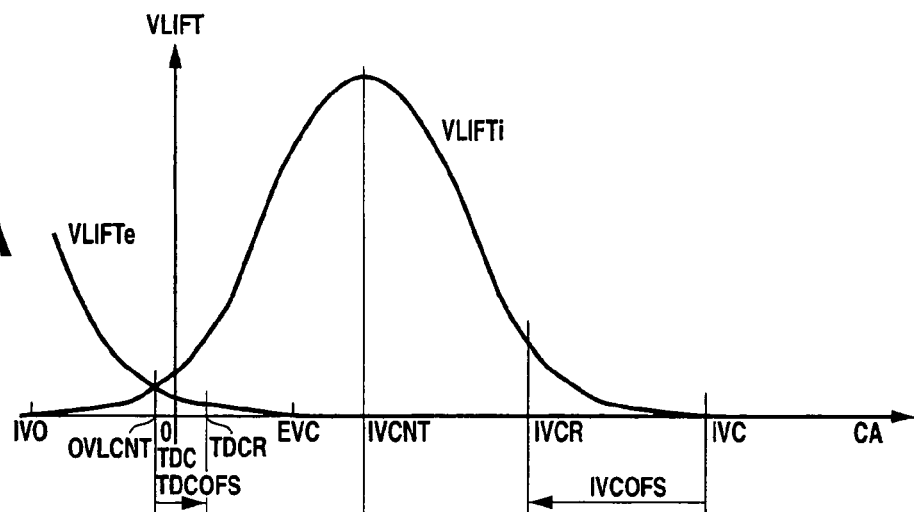
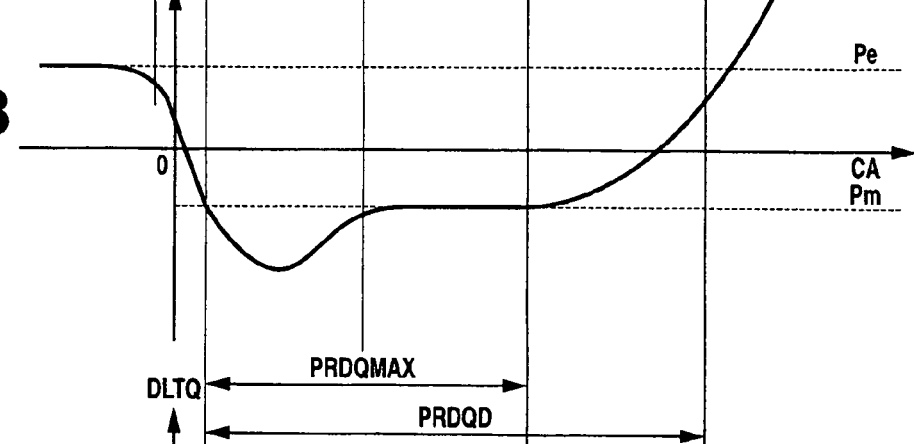
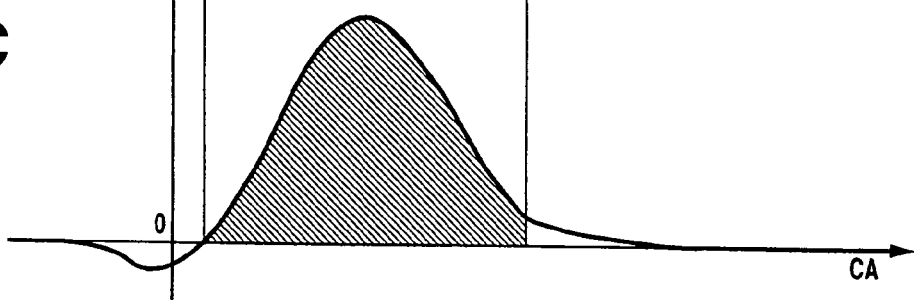

INTAKE-AIR QUANTITY CONTROL SYSTEM OF ENGINE

TECHNICAL FIELD

The present invention relates to an intake-air quantity control system of an engine capable of controlling a cylinder intake-air quantity mainly by variable control of an operating characteristic of an intake valve, and specifically to the improvement of an intake-air quantity control technology ensuring an engine power output performance in a high-load range.

BACKGROUND ART

In recent years, there have been proposed and developed various intake-air quantity control technologies in which an intake-air quantity substantially corresponding to a target engine torque can be achieved mainly by variable control of an operating characteristic of an intake valve rather than throttle valve control. One such intake-air quantity control technology has been disclosed in Japanese Patent Provisional Publication No. 2002-256905.

SUMMARY OF THE INVENTION

In controlling a quantity of air drawn into an engine cylinder by variable control of an intake-valve operating characteristic, generally a control system (or a controller) is configured to calculate or determine the intake-valve operating characteristic based on a target value of the intake-air quantity.

However, the process to calculate the intake-valve operating characteristic often contains a processing section, which is affected by several disturbances, such as intake-air flow pulsations and temperature variations. As is generally known, such disturbance signals tend to considerably affect the control system's output signal. Thus, the engine power output tends to fluctuate (or undesirably reduce) in a high-load range, in particular, during a full-load operation. From the viewpoint of the enhanced control system's performance that ensures the engine power output performance, it is desirable to further improve the intake-air quantity control technology.

It is, therefore, in view of the previously-described disadvantages of the prior art, an object of the invention to ensure an engine output performance, while suppressing undesired fluctuations in engine power output even in a high-load range containing a full-load operation, in an intake-air quantity control system configuration of an internal combustion engine capable of controlling a cylinder intake-air quantity by variable control of an operating characteristic of an intake valve.

In order to accomplish the aforementioned and other objects of the present invention, an intake-air quantity control system of an engine employing a variable valve operating device capable of controlling a cylinder intake-air quantity by variable control of an operating characteristic of an intake valve, comprises a first target operating characteristic setting device configured to set a high-load period valve operating characteristic, preset to be suitable for the predetermined high-load range, as a target operating characteristic of the intake valve, in a predetermined high-load range, and a second target operating characteristic setting device configured to calculate a cylinder intake-air quantity corresponding to a target torque of the engine as a target intake-air quantity, and to set the target operating characteristic based on the calculated target intake-air quantity, in an engine operating range except the predetermined high-load range.

According to another aspect of the invention, an intake-air quantity control system of an engine employing a variable valve operating device capable of controlling a cylinder intake-air quantity by variable control of an operating characteristic of an intake valve, comprises a basic target operating characteristic setting device configured to calculate a cylinder intake-air quantity corresponding to a target torque of the engine as a target intake-air quantity, and to set a target operating characteristic based on the calculated target intake-air quantity, and a full-load period target operating characteristic setting device configured to set a full-load period valve operating characteristic, preset to be suitable for full-load operation, as the target operating characteristic of the intake valve regardless of the target intake-air quantity, in presence of a demand for the full-load operation.

According to a further aspect of the invention, an intake-air quantity control system of an engine employing a variable valve operating device capable of controlling a cylinder intake-air quantity by variable control of an operating characteristic of an intake valve, comprises a basic target operating characteristic setting device configured to calculate a cylinder intake-air quantity corresponding to a target torque of the engine as a target intake-air quantity, and to calculate a basic operating characteristic based on the calculated target intake-air quantity, and to set the basic operating characteristic as a target operating characteristic of the intake valve, in an engine operating range except a predetermined high-load range, and a high-load period target operating characteristic setting device configured to set a high-load period valve operating characteristic, preset to be suitable for the predetermined high-load range, as the target operating characteristic of the intake valve, in the predetermined high-load range.

The other objects and features of this invention will become understood from the following description with reference to the accompanying drawings.

BRIEF DESCRIPTION OF THE DRAWINGS

FIG. 4 is a diagram illustrating an example of a lookup table for a predetermined high-load range, which is defined by engine speed Ne and engine torque Te.

FIGS. 5A-5C are characteristic curves illustrating the mutual relation of an intake-valve operating characteristic (a variation in intake-valve lift amount VLIFTi) and an exhaust-valve operating characteristic (a variation in exhaust-valve lift amount VLIFTe), an in-cylinder pressure Pc, and a cylinder intake-air quantity DLTQ per unit crankangle.

DESCRIPTION OF THE PREFERRED EMBODIMENTS

Figure 1:
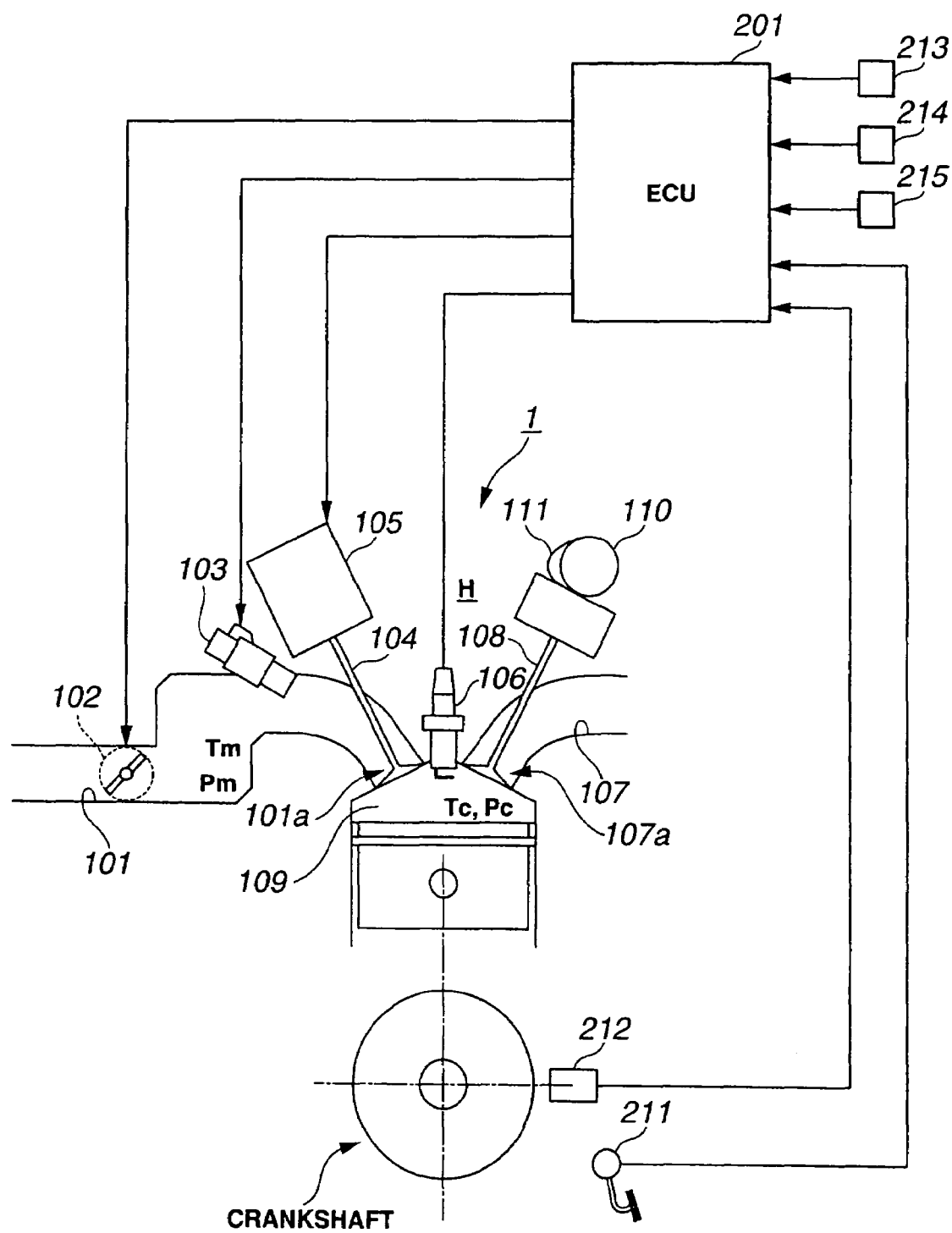
FIG. 1 is a system diagram illustrating an embodiment of an intake-air quantity control system for an internal combustion engine.

Referring now to the drawings, particularly to FIG. 1, the intake-air quantity control system of the embodiment is exemplified in an internal combustion engine 1 of an automotive vehicle having four valves (two intake valves and two exhaust valves) for each engine cylinder and an electronic engine control unit or an engine controller (ECU) coordinating all engine functions, such as fuel injection, ignition, throttle opening, and engine valve operating characteristic control systems. As seen in FIG. 1, an electronically-controlled throttle valve 102, a fuel injection valve 103 of an electronic fuel injection system, and an intake valve 104 are arranged in an intake passage 101 of an induction system, in that order.

Throttle valve 102 is able to control an intake air quantity depending on its throttle opening. Concretely, the electronically-controlled throttle valve unit is provided upstream of an intake port 101a for subsidiarily controlling a quantity of intake air and for creating a vacuum in the induction system for the purpose of recirculation of blow-by fumes in a blowby-gas recirculation system and/or canister purging in an evaporative emission control system, usually installed on practicable internal combustion engines. Generally, the electronically-controlled throttle valve unit is comprised of a round-disk shaped throttle valve (throttle valve 102), a throttle position sensor, and a throttle actuator. In a conventional manner, the throttle opening of the electronically-controlled throttle valve is adjusted by means of the throttle actuator. In the system of the embodiment, the intake-air quantity is controlled mainly by way of variable control of an operating characteristic of intake valve 104, and thus throttle valve 102 functions as an auxiliary intake-air quantity control device. Injection valve 103 is driven and opened in response to an injection signal (a control command signal) from the drive circuit of the ECU, in such a manner as to inject a required amount of fuel suited to achieve a desired equivalence ratio of theoretical requirement to quantity of intake air supplied (the controlled intake-air quantity). The air-fuel mixture is introduced into the engine cylinder by opening intake valve 104. The opening and closing actions of intake valve 104 can be controlled by means of a valve operating device 105.

Figure 2:
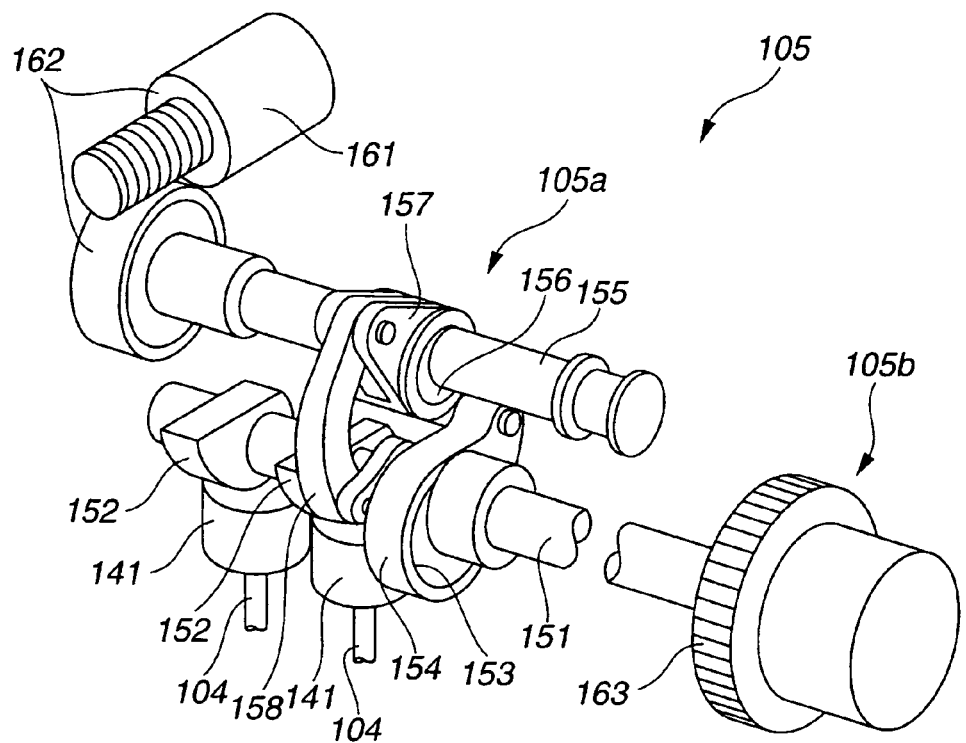
FIG. 2 is a perspective view showing an intake valve operating device comprised of a variable valve event and lift control (VEL) mechanism and a variable valve timing control (VTC) mechanism.

As best seen in FIG. 2, valve operating device 105 is comprised of a variable valve event and lift control (VEL) mechanism 105a capable of simultaneously continuously varying both of a valve lift amount and a working angle (a valve event), and a variable valve timing control (VTC) mechanism (or a phase control mechanism) 105b capable of continuously varying a phase of intake valve 104 (i.e., a phase of the center of the valve open period from the crankangle when intake valve 104 is opened to the crankangle when intake valve 104 is closed).

Figure 3:
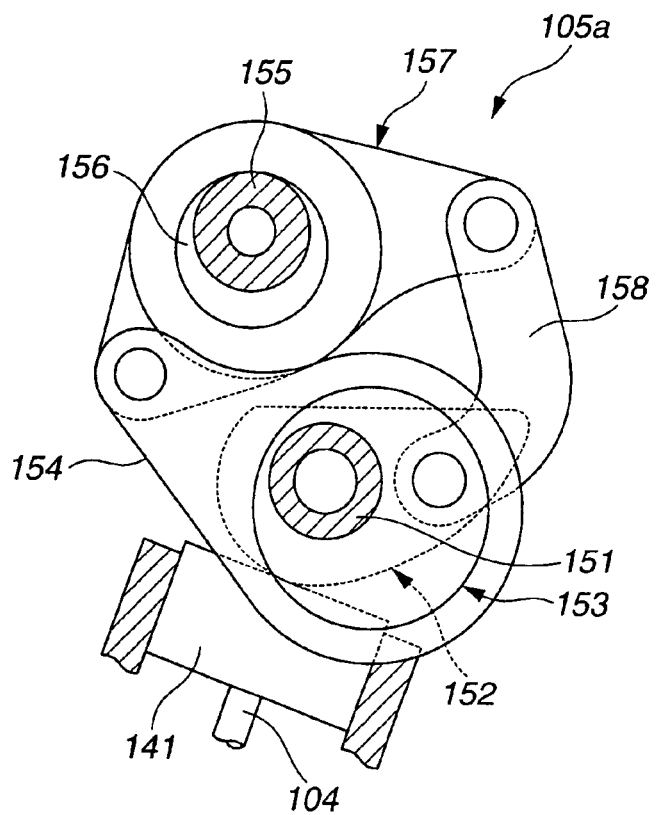
FIG. 3 is an explanatory view showing component parts of the VEL mechanism shown in FIG. 2.

As shown in FIGS. 2-3, VEL mechanism 105a is comprised of a drive shaft 151, a rockable cam 152, an eccentric cam 153, a ring-shaped link 154, a control shaft 155, a control cam 156, a rocker arm 157, and a rod-shaped link 158. Drive shaft 151 rotates in synchronism with rotation of a crankshaft and extends in the cylinder-row direction. Rockable cam 152 is mounted on the outer periphery of drive shaft 151 to permit relative rotation of rockable cam 152 to drive shaft 151. Rockable cam 152 operates to open and close the associated intake valve 104 via a valve lifter 141. Eccentric cam 153 is fixedly connected to the outer periphery of drive shaft 151. The axis of rotation of eccentric cam 153 is identical to the axis of drive shaft 151 and deviates from its geometric center. The axis of control shaft 155 is laid out in parallel with the axis of drive shaft 151. Control cam 156 is formed as a cylindrical cam (an eccentric cam), which is fixedly connected to the outer periphery of control shaft 155 such that the geometric center of control cam 156 deviates from the axis of rotation of control shaft 155. Rocker arm 157 is rotatably fitted onto the outer periphery of control cam 156 to permit relative rotation of rocker arm 157 to control cam 156. One end of rocker arm 157 is mechanically linked to ring-shaped link 154, while the other end of rocker arm 157 is mechanically linked to rockable cam 152 via rod-shaped link 158. Rotating control shaft 155 through a gear train 162 by means of an electromagnetic actuator 161 changes the center of oscillating motion of rocker arm 157. As a result of this, the lift amount and the working angle (valve open period) of intake valve 104 are both varied continuously simultaneously.

On the other hand, VTC mechanism 105b is provided to change an angular phase of drive shaft 151 relative to the crankshaft. In the system of the shown embodiment, a well-known valve timing control mechanism is used as VTC mechanism (phase control mechanism) 105b. And thus, the detailed description of the VTC mechanism will be omitted. For instance, in the shown embodiment, VTC mechanism 105b may be constructed by a helical-gear type VTC mechanism having a helical gear train, which is comprised of an internal helical gear formed on the inner periphery of the cylindrical-hollow cam sprocket 163, an external helical gear fixedly connected to or integrally formed with the axial end of drive shaft 151, and an intermediate helical gear disposed between the internal and external helical gears so that the intermediate helical gear is axially movable. Axial movement of the intermediate helical gear is generally produced by hydraulic pressure. The axial movement of the intermediate helical gear causes a change in angular phase of drive shaft 151 relative to cam sprocket 163.

Returning to FIG. 1, a spark plug 106 is installed on a cylinder head H and arranged to expose to the substantially center of the upper portion of a combustion chamber 109. The air-fuel mixture, drawn into the cylinder, is ignited by spark plug 106. Combustion gas is exhausted from combustion chamber 109 through an exhaust valve 108 (an exhaust port 107a) into an exhaust passage (an exhaust pipe) 107. Thereafter, the exhaust gases are purified by means of an exhaust emission control device such as an exhaust-gas purification catalyzer (not shown). The purified gases are discharged into the atmosphere. In the system of the shown embodiment, exhaust valve 108 is opened and closed by a drive cam 111 formed integral with a camshaft 110 of the outlet-port-valve side (exhaust valve 108), in accordance with a fixed valve operating characteristic that a working angle (or a lift amount) and a phase of exhaust valve 108 are both fixed. In lieu thereof, in a similar manner to the inlet-port-valve side (intake valve 104), at least one of the lift amount, working angle, and phase of exhaust valve 108 may be variably controlled by means of the VEL and/or VTC mechanisms installed on the exhaust valve side.

As shown in FIG. 1, the engine controller (ECU) 201 generally comprises a microcomputer. Engine controller 201 includes an input/output interface (I/O), memories (RAM, ROM), and a microprocessor or a central processing unit (CPU). The input/output interface (I/O) of ECU 201 receives input information from various engine/vehicle sensors, namely an accelerator sensor 211, a crank angle sensor 212, an intake-air pressure sensor (or a manifold air pressure sensor) 213, an intake-air temperature sensor 214, and an exhaust pressure sensor 215. Accelerator sensor 211 is provided to detect an amount of depression of an accelerator pedal, in other words, an accelerator opening APO. Crank angle sensor 212 is provided to detect the angular position of the engine crankshaft and revolutions of the crankshaft. Intake-air pressure sensor 213 is provided to detect a pressure in intake passage 101 (i.e., a pressure in an intake-air collector), simply an intake pressure Pm. Intake-air temperature sensor 214 is provided to detect a temperature in intake passage 101 (i.e., an air temperature in the upstream side of intake valve 104, simply an intake air temperature Tm. Exhaust pressure sensor 215 is provided to detect a pressure in exhaust passage 107, simply an exhaust pressure Pe. Engine speed Ne is derived or calculated based on the detection result of crank angle sensor 212 (i.e., the sensor signal from crank angle sensor 212). Within engine controller 201, the central processing unit (CPU) allows the access by the I/O interface of input informational data signals from the previously-discussed engine/vehicle sensors 211-215. The CPU of ECU 201 is responsible for carrying various control programs stored in memories and is capable of performing necessary arithmetic and logic operations for integrated engine control, coordinating various control functions, namely, intake-air quantity control, fuel injection control, and ignition timing control, all executed in response to an engine operating condition determined based on at least one engine operating parameter, such as engine speed Ne, accelerator opening APO, and the like. Computational results (arithmetic calculation results), that is, calculated output signals are relayed through the output interface circuitry of engine controller 201 to output stages, namely the actuators of valve operating device 105 included in the intake-air quantity control system, the fuel injection valves of the electronic injection control system, and the spark plugs of the electronic ignition system.

The intake-air quantity control executed by the control system of the embodiment is briefly explained hereunder.

A torque to be generated by engine 1, that is, a target engine torque tTe, is calculated or determined based on at least one engine operating parameter, such as engine speed Ne, accelerator opening APO, and the like. Valve operating device 105 and throttle valve 102 are operated in response to the target engine torque tTe. More concretely, a target fresh-air quantity tQcyl is calculated as a cylinder intake-air quantity corresponding to the target engine torque tTe. Target fresh-air quantity tQcyl is calculated or determined based on target engine torque tTe. A target operating characteristic of intake valve 104 is set or determined based on target fresh-air quantity tQcyl so as to operate valve operating device 105 in accordance with the set target operating characteristic. Additionally, an actual cylinder intake-air quantity Qcyl is calculated or estimated or detected, and then a deviation (=tQcyl−Qcyl) of the actual cylinder intake-air quantity Qcyl from the target fresh-air quantity tQcyl, in other words, an error signal (the difference between the desired output tQcyl and the actual output Qcyl), is calculated. Throttle valve 102 is operated in response to the calculated deviation, i.e., the error signal such that the throttle opening is adjusted in a direction for reducing of the deviation (=tQcyl−Qcyl) (or toward a throttle position for reducing of the deviation (=tQcyl−Qcyl). As set forth above, in the system of the embodiment, valve operating device 105 serves as a main intake-air quantity control device, whereas throttle valve 102 serves as an auxiliary intake-air quantity control device.

The previously-discussed valve operating mode (hereinafter is referred to as a "normal control mode" or a "normal operating mode" or a "basic control mode"), at which the actual operating characteristic of intake valve 104 is controlled or adjusted to the target operating characteristic calculated or determined based on target engine torque tTe (in other words, target fresh-air quantity tQcyl), is executed as a basic intake-air quantity control mode. Furthermore, in the intake-air quantity control system of the embodiment, in the presence of a demand that the engine has to be operated in a predetermined high-load range (see the right-hand diagonal shading area or the hatching area in FIG. 4), the valve operating mode is switched from the previously-noted normal operating mode to another valve operating mode at which the actual operating characteristic of intake valve 104 is controlled or adjusted to an operating characteristic preset to be suitable for the predetermined high-load range, regardless of target fresh-air quantity tQcyl. The latter valve operating mode is hereinafter referred to as a "high-load period control mode" or a "high-load operating mode". The operating characteristic of intake valve 104, preset to be suitable for the predetermined high-load range, is hereinafter referred to as a "high-load period valve operating characteristic". Briefly speaking, the control system configuration of the embodiment is characterized in that the operating characteristic of intake valve 104 is switched to the high-load period valve operating characteristic regardless of target fresh-air quantity tQcyl, in the presence of a demand that the engine has to be operated in the predetermined high-load range as indicated by the right-hand diagonal shading in FIG. 4. The meaning of the above-mentioned wording "regardless of target fresh-air quantity tQcyl" is almost equivalent to the wording "without calculating target fresh-air quantity tQcyl" or the wording "regardless of the result of calculation for target fresh-air quantity tQcyl". As can be seen from the predetermined high-load range as indicated by the right-hand diagonal shading in FIG. 4, the wording "predetermined high-load range" means (i) engine operating points on the engine operating characteristic curve of a full-load operation (in other words, a wide open throttle (WOT) operation) and (ii) an arbitrarily-set high-load operating range in close vicinity to the WOT operation. Thus, the presence of a demand for full-load operation (in other words, the full-open state of the accelerator) is contained in the predetermined high-load range.

For the reasons discussed hereunder, the previously-noted mode-switching between the normal control mode (normal operating characteristic of intake valve 104) and the high-load period control mode (high-load period operating characteristic of intake valve 104) is necessary. That is, the process to calculate the target intake-valve operating characteristic derived from target engine torque tTe (target fresh-air quantity tQcyl) contains a processing section, which is affected by several disturbances, such as intake-air flow pulsations and temperature variations. This means that the arithmetic-calculation error easily occurs. Therefore, even when the operating characteristic of intake valve 104 has already been controlled or adjusted to the target operating characteristic calculated based on target engine torque tTe (target fresh-air quantity tQcyl), there is a possibility of a deviation (i.e., a lack) of the actually-generated engine torque from the desired engine power output (the desired engine torque). On the other hand, it is possible to calculate or estimate beforehand or to preprogram or to preset a valve operating characteristic needed to ensure the desired engine power output. Thus, in the system of the embodiment, an intake-valve operating characteristic preset to be suitable for a predetermined high-load range is pre-memorized as a high-load period valve operating characteristic. In the presence of a demand that the engine has to be operated in the predetermined high-load range, it is possible to easily ensure the desired engine power output even in the high-load range by setting the high-load period valve operating characteristic to the target operating characteristic, thus insuring the engine power output performance in the high-load range. For this reason, the control system of the embodiment is configured so that the operating characteristic control mode of intake valve 104 is switchable depending on the engine operating range, exactly, depending on whether the operating point of engine 1 is within the predetermined high-load range or out of the predetermined high-load range. As described later, the system of the embodiment uses a "full-load period valve operating characteristic" as the high-load period valve operating characteristic. The wording "full-load period valve operating characteristic" means an intake-valve operating characteristic preset to be suitable for the full-load operation (WOT power enrichment operation) of engine 1. The full-load period valve operating characteristic itself is preset or predetermined in such a manner as to ensure a required engine power output during WOT operation. Therefore, it is possible to certainly insure the engine power output performance in the high-load range by switching from the normal operating characteristic of intake valve 104 to the full-load period valve operating characteristic used or set as the high-load period valve operating characteristic.

Prior to the detailed explanation of intake-air quantity control executed by the control system of the embodiment, values used for respective arithmetic calculations and logic operations are explained in reference to the characteristic curves shown in FIGS. 5A-5C.

FIG. 5A shows the operating characteristic curve of intake valve 104 whose lift amount is represented by "VLIFTi" and the operating characteristic curve of exhaust valve 108 whose lift amount is represented by "VLIFTe". FIG. 5B shows the in-cylinder pressure Pc characteristic curve. In FIG. 5B, the symbol "Pm" denotes an intake (manifold) pressure, whereas the symbol "Pe" denotes an exhaust (gas) pressure. FIG. 5C is the characteristic curve of a cylinder intake-air quantity per unit crankangle, denoted by the symbol "DLTQ". In FIG. 5C, "PRDQ$_D$" denotes the integrated value of unit-crankangle cylinder intake-air quantity DLTQ during a valve open period of intake valve 104 from a real top dead center TDCR (described later) to intake valve closure timing IVC, whereas "PRDQ$_{MAX}$" denotes the integrated value of unit-crankangle cylinder intake-air quantity DLTQ during a valve open period of intake valve 104 from real top dead center TDCR to a real intake valve closure timing IVCR (described later).

As can be seen from the characteristic curves of FIGS. 5A-5C, in the shown embodiment, the point where in-cylinder pressure Pc becomes identical to intake pressure Pm due to a drop in in-cylinder pressure Pc, that is, the actual intake-stroke starting point at which the intake stroke starts, is defined as an effective top dead center or a real top dead center "TDCR". The point where compression of air drawn into the cylinder really starts, that is, the actual intake-stroke termination point at which the intake stroke ends, is defined as an effective intake valve closure timing or a real intake valve closure timing "IVCR". The point where the lift amount VLIFTi of intake valve 104 and the lift amount VLIFTe of exhaust valve 108 become identical to each other, that is, the crank angle corresponding to the center of the valve overlap period, is defined as an overlap central angle "OVLCNT". An offset amount (or a deviation) of effective top dead center (real top dead center TDCR) from overlap central angle OVLCNT is defined as a top-dead-center offset amount "TDCOFS". An offset amount (or a deviation) of effective intake valve closure timing (real intake valve closure timing IVCR) from a set intake valve closure timing IVC is defined as an intake-valve-closure-timing offset amount "IVCOFS".

Figure 6:
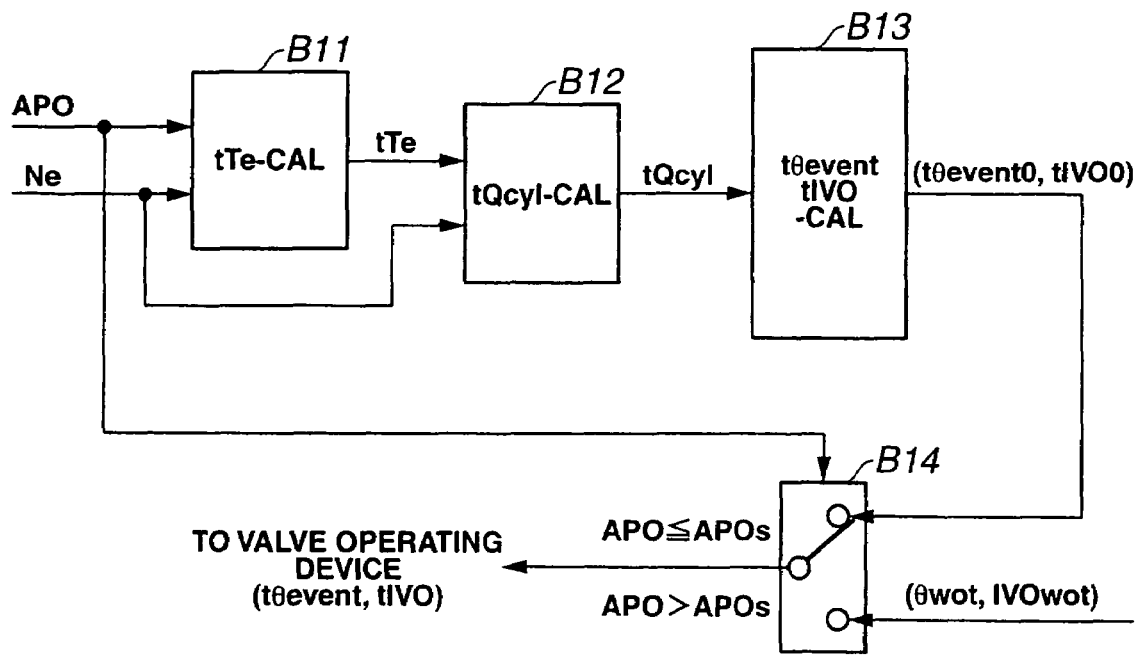
FIG. 6 is a block diagram showing the system configuration of the intake-air quantity control system of the embodiment.

Referring now to FIG. 6, there is shown the system configuration of the intake-air quantity control system of the embodiment.

As can be seen from the block diagram of FIG. 6, a target engine torque calculation section B11 arithmetically calculates or determines target engine torque tTe based on accelerator opening APO and engine speed Ne.

Figure 7:
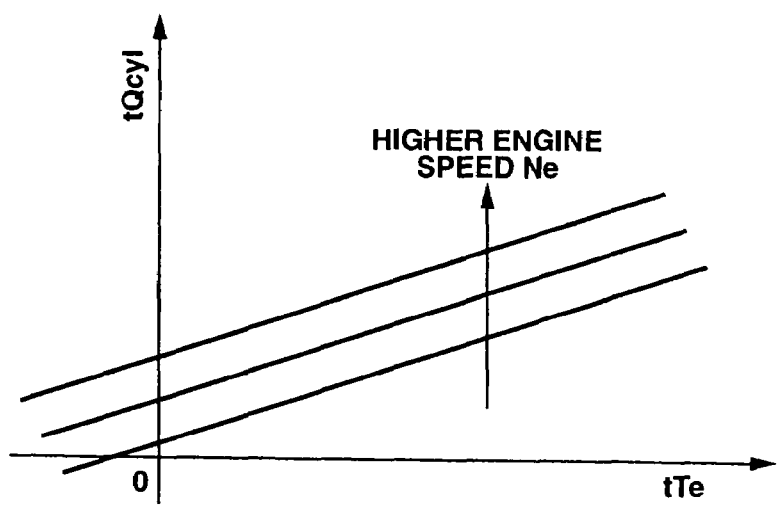
FIG. 7 is a preprogrammed target fresh-air quantity map used to retrieve or calculate a target fresh-air quantity tQcyl.

A target fresh-air quantity calculation section B12 arithmetically calculates or retrieves target fresh-air quantity tQcyl based on the calculated target engine torque tTe and engine speed Ne from the preprogrammed tTe-Ne-tQcyl characteristic map as shown in FIG. 7.

As detailed later, a target operating characteristic setting section B13 arithmetically calculates a basic target operating characteristic (i.e., a basic target working angle tθevent0 and a basic target intake-valve-open timing tIVO0) of intake valve 104 based on target fresh-air quantity tQcyl.

A valve-operating-characteristic switching output section, simply a switching output section B14, operates to switch the target operating characteristic to be output depending on whether the operating point of engine 1 is within the predetermined high-load range. In order to determine whether the engine operating point is within the predetermined high-load range, the preprogrammed high-load range lookup table as indicated by the right-hand diagonal shading in FIG. 4 may be used. In lieu thereof, the check for engine 1 operating within the predetermined high-load range, can be made based on the detected accelerator opening APO (exactly, based on the result of comparison between the detected accelerator opening APO and a predetermined threshold value APOs corresponding to a high accelerator opening). The system of the embodiment utilizes the comparison result of the detected accelerator opening APO and threshold value APOs for determining whether engine 1 is operating within the predetermined high-load range.

More concretely, when the detected accelerator opening APO is less than or equal to predetermined threshold value APOs, that is, in case of APO≦APOs, it is determined that the engine is not operated within the predetermined high-load range (or at the full-load operation or at WOT operation). Thus, as the target operating characteristic (i.e., a target working angle tθevent and a target intake-valve-open timing tIVO) of intake valve 104, a command signal corresponding to the basic target operating characteristic (i.e., basic target working angle tθevent0 and basic target intake-valve-open timing tIVO0), calculated by target operating characteristic setting section B13, is output to valve operating device 105. In this case, valve operating device 105 controls the operating characteristic of intake valve 104 such that the actual intake-valve operating characteristic is adjusted to the target operating characteristic (that is, the basic target operating characteristic calculated by target operating characteristic setting section B13).

Conversely when the detected accelerator opening APO exceeds predetermined threshold value APOs, that is, in case of APO>APOs, it is determined that the engine is operated within the predetermined high-load range (or at the full-load operation or at WOT operation). Thus, as the target operating characteristic (i.e., target working angle tOevent and target intake-valve-open timing tIVO) of intake valve 104, switching output section B14 generates a command signal corresponding to a preset or pre-memorized high-load period valve operating characteristic (i.e., a preset wide-open-throttle (WOT) working angle θwot and a preset wide-open-throttle (WOT) intake-valve-open timing IVOwot) to valve operating device 105. In this case, valve operating device 105 controls the operating characteristic of intake valve 104 such that the actual intake-valve operating characteristic is adjusted to the preset high-load period valve operating characteristic (i.e., preset WOT working angle θwot and preset WOT intake-valve-open timing IVOwot).

As appreciated from the above, switching output section B14 functions as a first target operating characteristic setting device or a high-load period target operating characteristic setting device ($1^{st}$ target operating characteristic setting means) configured to set the preset high-load period valve operating characteristic (θwot, IVOwot) as the target operating characteristic (tθevent, tIVO) of intake valve 104 in the predetermined high-load range including WOT operation. Target operating characteristic setting section B13 and switching output section B14 function as a second target operating characteristic setting device or a basic target operating characteristic setting device ($2^{nd}$ target operating characteristic setting means) configured to set the basic target operating characteristic (tθevent0, tIVO0) calculated based on target fresh-air quantity tQcyl (corresponding to the cylinder intake-air quantity needed to achieve target engine torque tTe) as the target operating characteristic (tθevent, tIVO).

Figure 8:
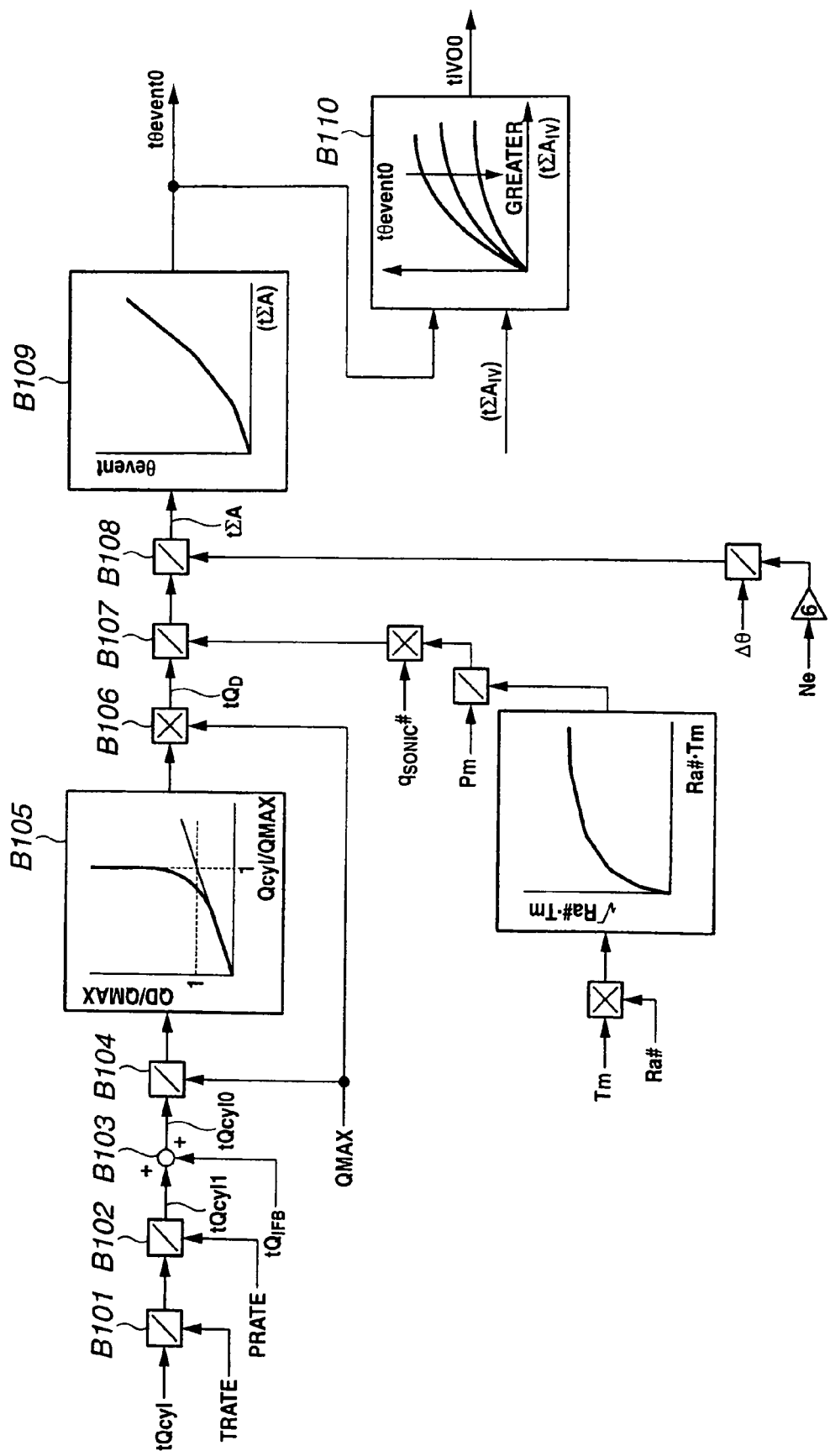
FIG. 8 is a block diagram showing arithmetic operations executed by a target operating characteristic setting section.

Referring now to FIG. 8, there is shown the block diagram explaining the arithmetic processing executed by target operating characteristic setting section B13.

Briefly speaking, a static component tQcyl1 of the target fresh-air quantity is derived or calculated by removing or eliminating intake-air flow pulsations from the calculated target fresh-air quantity tQcyl. Concretely, as appreciated from the following expression (1), the static component tQcyl1 is calculated by dividing the calculated target fresh-air quantity tQcyl by a correction factor TRATE corresponding to variations of intake air temperature Tm, occurring owing to the intake-air flow pulsations, within a divider B101, and by further dividing the same (target fresh-air quantity tQcyl) by a correction factor PRATE corresponding to fluctuations of intake pressure Pm, occurring owing to the intake-air flow pulsations, within a divider B102.

$$tQcyl1 = \frac{tQcyl}{TRATE \cdot PRATE} \quad (1)$$

Hereinafter described in detail are two correction factors TRATE and PRATE of the above expression (1). An airflow quantity ΔQcyl per unit time Δt concerning airflow passing through intake valve 104 can be represented by the following expression (2).

$$\Delta Qcyl = A \cdot \frac{Pm}{\sqrt{Ra \cdot Tm}} \cdot \sqrt{\frac{2\kappa}{\kappa - 1} \cdot \left\{ \left(\frac{Pc}{Pm}\right)^{\frac{2}{\kappa}} - \left(\frac{Pc}{Pm}\right)^{\frac{\kappa+1}{\kappa}} \right\}} \quad (2)$$

where "A" denotes an intake-valve opening area detected or calculated every predetermined crankangles Δθ, "Ra" denotes a gas constant of air, "κ" denotes a ratio of specific ratio of air, and "Pc" denotes the in-cylinder pressure.

The cylinder intake-air quantity Qcyl is calculated as the integrated value ΣΔQcyl, obtained by integrating airflow quantity ΔQcyl per unit time Δt, during the intake-stroke period from the beginning of intake stroke to the end of the same intake stroke. Regarding the above expression (2) representing airflow quantity ΔQcyl per unit time Δt, when airflow, passing through intake valve 104, is a sonic flow, the fore-and-aft pressure ratio of intake valve 104 (that is, the ratio Pc/Pm of in-cylinder pressure Pc to intake pressure Pm) is fixed to a critical pressure ratio (related to a fixed value $q_{SONIC}$ described later) without being affected by the intake pressure fluctuations caused by intake-air flow pulsations. Thus, in the case of such a sonic flow, as appreciated from the following expression (3), the cylinder intake-air quantity Qcyl has a characteristic that cylinder intake-air quantity Qcyl is in direct proportion to intake pressure Pm and also in direct proportion to the inverse of the square root of intake air temperature Tm. That is, the expression (3) represents the cylinder intake-air quantity Qcyl in the sonic-flow state.

$$Qcyl \propto \frac{Pm}{\sqrt{Tm}} \quad (3)$$

In contrast, when airflow quantity ΔQcyl per unit time Δt is almost zero and thus the cylinder volume is changing quasi-statically, cylinder intake-air quantity Qcyl is derived from the following expression (4) by the state equation of gas on the assumption that air existing within intake passage 101 has been charged into the engine cylinder at intake valve closure timing IVC, fully taking into account an intake pressure fluctuation ΔPmivc caused by intake-air flow pulsations and an intake air temperature variation ΔTmivc caused by intake-air flow pulsations. That is, as appreciated from the expression (4), the cylinder intake-air quantity Qcyl has a characteristic that cylinder intake-air quantity Qcyl is in direct proportion to the intake pressure (Pm+ΔPmivc) that took the intake pressure fluctuation ΔPmivc caused by intake-air flow pulsations into account and also in direct proportion to the inverse of the intake air temperature (Tm+ΔTmivc) that took the intake air temperature variation ΔTmivc caused by intake-air flow pulsations into account. That is, the expression (4) represents the cylinder intake-air quantity Qcyl in the quasi-static-change state.

$$Qcyl \propto \frac{Pm + \Delta Pmivc}{Tm + \Delta Tmivc} \quad (4)$$

Figure 9:
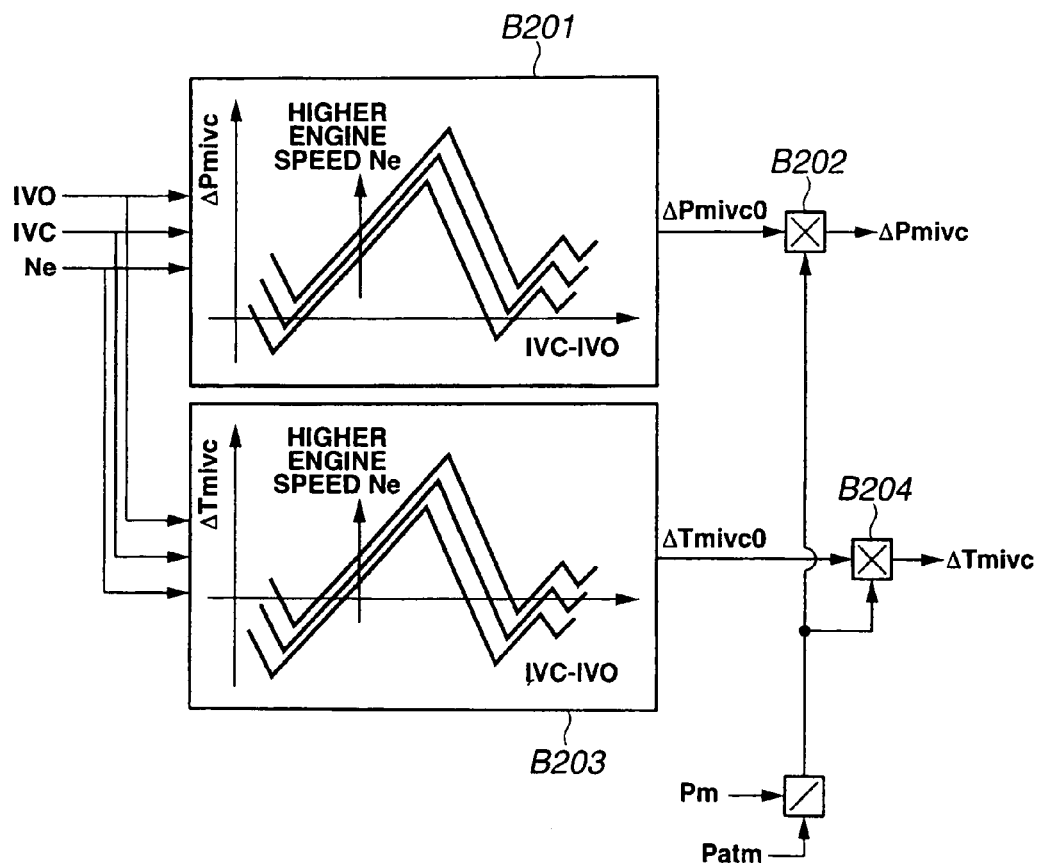
FIG. 9 is a block diagram showing arithmetic operations used to calculate variations or fluctuations or disturbance signals created by intake-air flow pulsations (intake pressure fluctuations and/or intake-air temperature variations).

The above-mentioned intake pressure fluctuation ΔPmivc and intake air temperature variation ΔTmivc are calculated by the arithmetic processing indicated by the block diagram of FIG. 9.

As seen in FIG. 9, an intake-pressure-fluctuation basic value calculation section B201 calculates or retrieves an intake-pressure-fluctuation basic value ΔPmivc0 based on engine speed Ne and a deviation (IVC–IVO) of intake valve closure timing IVC from intake valve open timing IVO, from a predetermined map as drawn in the block corresponding to intake-pressure-fluctuation basic value calculation section B201 in FIG. 9. Thereafter, within a multiplier B202 the calculated intake-pressure-fluctuation basic value ΔPmivc0 is multiplied by a pressure ratio Pm/Patm of intake pressure Pm to atmospheric pressure Patm, so as to obtain the intake pressure fluctuation ΔPmivc as the multiplied value, that is, ΔPmivc=ΔPmivc0×(Pm/Patm). In a similar manner to intake-pressure-fluctuation basic value calculation section B201, an intake-air-temperature-variation basic value calculation section B203 calculates or retrieves an intake-air-temperature-variation basic value ΔTmivc0 based on engine speed Ne and the deviation (IVC–IVO) between intake valve closure timing IVC and intake valve open timing IVO, from a predetermined map as drawn in the block corresponding to intake-air-temperature-variation basic value calculation section B203 in FIG. 9. Thereafter, within a multiplier B204 the calculated intake-air-temperature-variation basic value ΔTmivc0 is multiplied by the pressure ratio Pm/Patm of intake pressure Pm to atmospheric pressure Patm, so as to obtain the intake air temperature variation ΔTmivc as the multiplied value, that is, ΔTmivc=ΔTmivc0×(Pm/Patm).

As the state transfers from the sonic-flow state represented by the expression (3) to the quasi-static-change state represented by the expression (4), intake pressure fluctuation ΔPmivc and intake air temperature variation ΔTmivc both caused by intake-air flow pulsations tend to increase. Thus, a first correction factor K1 is set to properly reflect an increase in intake pressure fluctuation ΔPmivc and an increase in intake air temperature variation ΔTmivc, occurring owing to the transition from the sonic-flow state to the quasi-static-change state. In addition to the first correction factor K1, a second correction factor K2 for a smooth transition between the sonic-flow state and the quasi-static-change state is also set or provided. A general formula for cylinder intake-air quantity Qcyl, to which the first and second correction factors K1 and K2 are added and that can apply to all engine operating ranges, is represented or defined by the following expression (5).

$$Qcyl \propto (Pm + K1 \cdot \Delta Pmivc) \cdot (Tm + K1 \cdot \Delta Tmivc)^{\frac{-1}{(2-K2)}} \quad (5)$$

On the other hand, a static component Qcyl1 of the cylinder intake-air quantity is derived or calculated by removing or eliminating intake-air flow pulsations from the cylinder intake-air quantity. That is, the static component Qcyl1 of the cylinder intake-air quantity can be represented by the following expression (6) by removing the first correction factor K1 from the aforementioned expression (5).

$$Qcyl1 \propto (Pm + \Delta Pmivc) \cdot (Tm + \Delta Tmivc)^{\frac{-1}{(2-K2)}} \quad (6)$$

From the expressions (5) and (6) mentioned above, the following expression (7) can be obtained.

$$Qcyl = Qcyl1 \cdot \left(\frac{(Pm + K1 \cdot \Delta Pmivc)}{(Pm + \Delta Pmivc)}\right) \cdot \left(\frac{(Tm + K1 \cdot \Delta Tmivc)^{\frac{-1}{2-K2}}}{(Tm + \Delta Tmivc)^{\frac{-1}{2-K2}}}\right) \quad (7)$$

Hereupon, the divided value (Pm+K1·ΔPmivc)/(Pm+Δpmivc) in the right-hand side of the expression (7) is set as a pressure correction factor PRATE based on intake pressure fluctuation ΔPmivc. On the other hand, the divided value (Tm+K1·ΔTmivc)$^{-1/(2-K2)}$/(Tm+ΔTmivc)$^{-1/(2-K2)}$ in the right-hand side of the expression (7) is set as a temperature correction factor TRATE based on intake air temperature variation ΔTmivc. Therefore, the above-mentioned expression (7) can be represented by the following expression (8). The previously-noted expression (1) can be derived or obtained from the expression (8).

$$Qcyl = Qcyl1 \cdot PRATE \cdot TRATE \quad (8)$$

Returning to FIG. 8, within an adder B103 a target blow-back gas amount (a target in-cylinder residual gas amount) $tQ_{IFB}$ is added to the static component tQcyl1 of the target fresh-air quantity (see the following expression (9)). The summed value (tQcyl1+$tQ_{IFB}$) is set as a target cylinder intake-air quantity tQcyl0 corresponding to the gas amount actually drawn into the engine cylinder. Note that target blow-back gas amount $tQ_{IFB}$, to be added to the static component tQcyl1, variably set depending on the engine operating condition, that is, at least one engine operating parameter such as engine speed, engine load, and the like.

$$tQcyl0 = tQcyl1 + tQ_{IFB} \quad (9)$$

Next, within a divider B104 shown in FIG. 8, target cylinder intake-air quantity tQcyl0 is divided by a maximum intake-air quantity $Q_{MAX}$ to derive the divided value (tQcyl0/$Q_{MAX}$). Thereafter, within a converter B105 the result of calculation of divider B104, that is, the divided value (tQcyl0/$Q_{MAX}$) is converted into a ratio ($Q_D/Q_{MAX}$) of a sonic intake-air quantity $Q_D$ to the maximum intake-air quantity $Q_{MAX}$, utilizing or retrieving a predetermined conversion table as drawn in the block corresponding to converter B105 in FIG. 8.

Hereunder described in detail is the relation among the sonic intake-air quantity $Q_D$, the maximum intake-air quantity $Q_{MAX}$, the ratio ($Q_D/Q_{MAX}$) of sonic intake-air quantity $Q_D$ to maximum intake-air quantity $Q_{MAX}$, and the ratio (Qcyl/$Q_{MAX}$) of cylinder intake-air quantity Qcyl to maximum intake-air quantity $Q_{MAX}$.

The above-mentioned sonic intake-air quantity $Q_D$ is a cylinder intake-air quantity obtained in a sonic-flow state where air is drawn into the engine cylinder as a sonic flow with the intake-valve opening area corresponding to the operating characteristic of intake valve 104. Sonic intake-air quantity $Q_D$ is calculated by the following expressions (10) and (11).

$$Q_D = (\Sigma A) \cdot \frac{Pm}{\sqrt{Ra \cdot Tm}} \cdot \sqrt{\frac{2\kappa}{\kappa-1} \cdot \left\{\left(\frac{Pc}{Pm}\right)^{\frac{2}{\kappa}} - \left(\frac{Pc}{Pm}\right)^{\frac{\kappa+1}{\kappa}}\right\}} \cdot \Delta t \qquad (10)$$

where the symbol ($\Sigma A$) denotes the integrated value (the total intake-valve opening area), obtained by integrating intake-valve opening area A detected or calculated every predetermined crankangles $\Delta\theta$. There is a correlation between unit time $\Delta t$ and predetermined crankangle $\Delta\theta$. In other words, predetermined crankangle $\Delta\theta$ can be expressed by unit time $\Delta t$ as a certain unit being different from but correlative to a crankangle. In the shown embodiment, the unit time $\Delta t$ can be calculated by the expression $\Delta t = \Delta\theta/(6 \times Ne)$, where Ne denotes engine speed.

In the case that airflow, passing through intake valve 104, is a sonic flow, the fore-and-aft pressure ratio of intake valve 104 (that is, the ratio Pc/Pm of in-cylinder pressure Pc to intake pressure Pm) is given as a critical pressure ratio, which is represented by the formula $\{2/(\kappa+1)\}^{(\kappa/\kappa-1)}$, where $\kappa$ denotes a ratio of specific ratio of air. Thus, in the sonic-airflow state, the value $[\{2\kappa/(\kappa-1)\}\{(Pc/Pm)^{2/\kappa} - (Pc/Pm)^{(\kappa+1)/\kappa}\}]^{1/2}$ in the right-hand side of the expression (10) becomes fixed to a fixed value (a constant) $q_{SONIC}$ without being affected by the intake pressure fluctuations caused by intake-air flow pulsations. Thus, the above-mentioned expression (10) can be represented by the following expression (11). The system of the embodiment uses the following expression (11).

$$Q_D = (\Sigma A) \cdot \frac{Pm}{\sqrt{Ra \cdot Tm}} \cdot qSONIC \cdot \Delta t \qquad (11)$$

Figure 10:
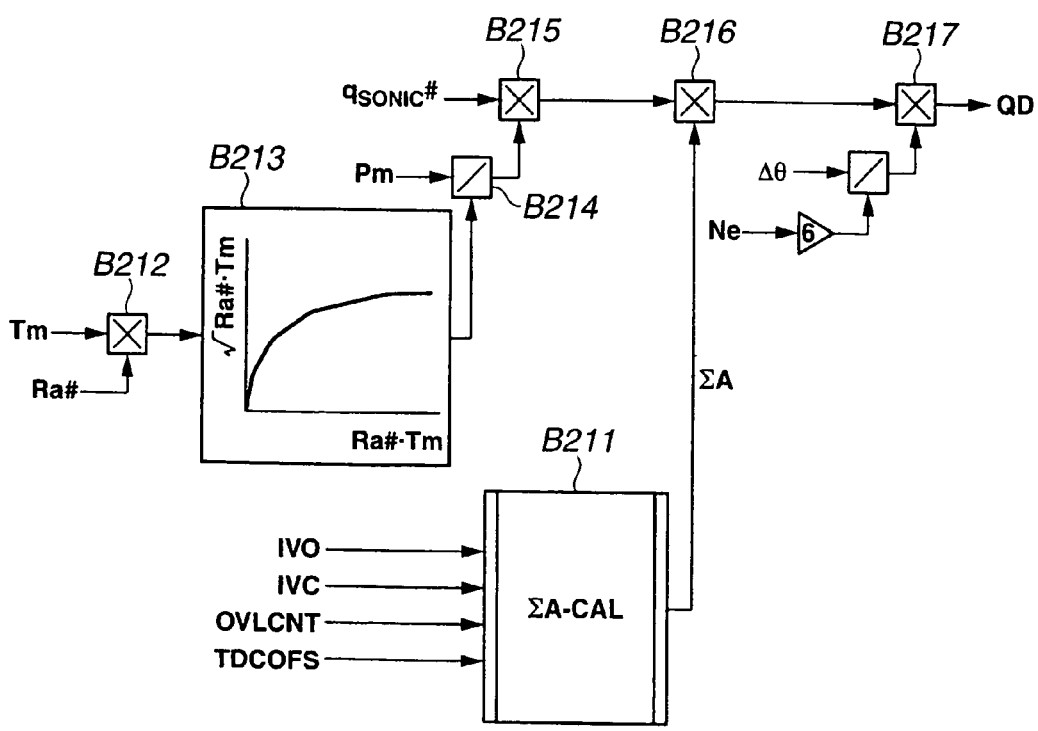
FIG. 10 is a block diagram showing arithmetic operations used to calculate a sonic intake-air quantity $Q_D$ for intake airflow.

Concretely, the previously-noted sonic intake-air quantity $Q_D$ is calculated by the arithmetic processing indicated by the block diagram of FIG. 10. As appreciated from the block diagram of FIG. 10, a total opening area calculation section B211 operates to grasp or determine an operating characteristic (i.e., open timing and closure timing, and a valve lift amount) of intake valve 104 based on both of intake valve open timing IVO and intake valve closure timing IVC. Total opening area calculation section B211 also operates to calculate real top dead center TDCR based on both of overlap central angle OVLCNT and top-dead-center offset amount TDCOFS. Additionally, total opening area calculation section B211 calculates an intake-valve opening area A every unit crankangles $\Delta\theta$ during a valve open period of intake valve 104 from the calculated real top dead center TDCR to intake valve closure timing IVC, from the determined operating characteristic. Total opening area calculation section B211 sets the integrated value, which is obtained by integrating the intake-valve opening areas A calculated every unit crankangles $\Delta\theta$ during the intake-valve open period from real top dead center TDCR to intake valve closure timing IVC, to a total opening area ($\Sigma A$).

Figure 11:
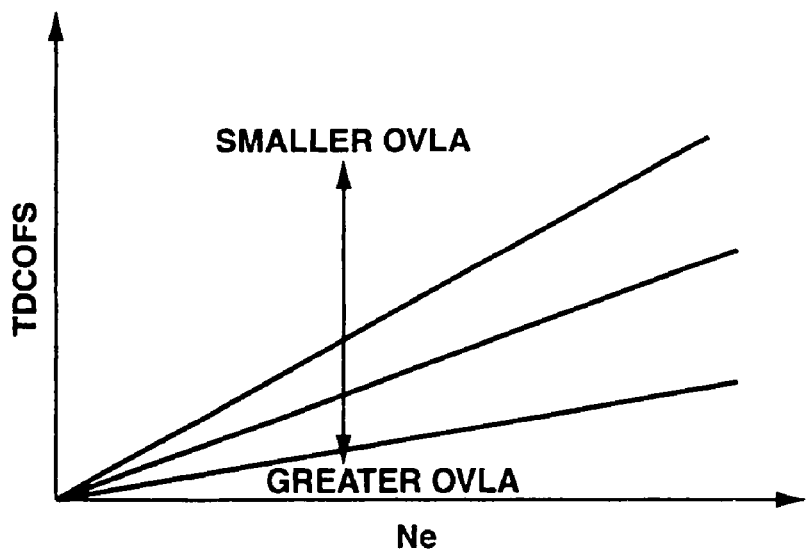
FIG. 11 is a preprogrammed top-dead-center offset amount map used to retrieve or calculate a top-dead-center offset amount TDCOFS based on the engine speed Ne and an overlap opening area OVLA.
Figure 12:
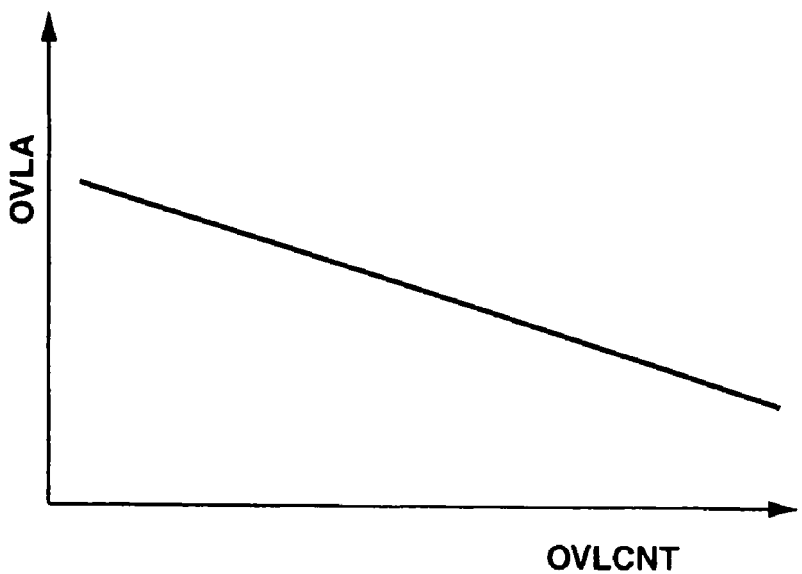
FIG. 12 is a preprogrammed overlap opening area map used to retrieve or calculate the overlap opening area OVLA based on an overlap central angle OVLCNT.

Hereupon, top-dead-center offset amount TDCOFS is calculated or retrieved based on engine speed Ne and overlap opening area OVLA at overlap central angle OVLCNT, from the preprogrammed Ne-OVA-TDCOFS characteristic map as shown in FIG. 11. The overlap opening area OVLA at overlap central angle OVLCNT corresponds to a valve opening area at overlap central angle OVLCNT at which the opening area of intake valve 104 becomes identical to the opening area of exhaust valve 108. As can be appreciated from the Ne-OVA-TDCOFS characteristic map of FIG. 11, the top-dead-center offset amount TDCOFS has a characteristic that top-dead-center offset amount TDCOFS increases, as engine speed Ne increases and overlap opening area OVLA decreases. As appreciated from the preprogrammed OVLCNT-OVLA characteristic map of FIG. 12, the overlap opening area OVLA has a characteristic that overlap opening area OVLA increases, as overlap central angle OVLCNT decreases (or phase-advances).

Within a multiplier B212 in the block diagram of FIG. 10, intake air temperature Tm is multiplied by the gas constant Ra of air, so as to generate the multiplied value (Ra·Tm). Within a converter B213 the result of calculation of multiplier B212, that is, the multiplied value (Ra·Tm) is converted into a square root $\{\sqrt{(Ra \cdot Tm)}\}$ of the multiplied value (Ra·Tm), utilizing or retrieving a predetermined conversion table as drawn in the block corresponding to converter B213 in FIG. 10. Thereafter, within a divider B214 intake pressure Pm is divided by the square root $\{\sqrt{(Ra \cdot Tm)}\}$ generated from converter B213, so as to generate the divided value Pm/$\{\sqrt{(Ra \cdot Tm)}\}$. Within a multiplier B215 the result of calculation of divider B214, that is, the divided value Pm/$\{\sqrt{(Ra \cdot Tm)}\}$ is multiplied with the previously-discussed fixed value (the constant) $q_{SONIC}$, so as to generate the multiplied value Pm·$q_{SONIC}/\{\sqrt{(Ra \cdot Tm)}\}$.

Thereafter, within a multiplier B216 the result of calculation of total opening area calculation section B211, that is, total opening area ($\Sigma A$) is multiplied with the result of calculation of multiplier B215, that is, the multiplied value Pm·$q_{SONIC}/\{\sqrt{(Ra \cdot Tm)}\}$, so as to generate the multiplied value ($\Sigma A$)·Pm·$q_{SONIC}/\{\sqrt{(Ra \cdot Tm)}\}$. Within a multiplier B217 the result of calculation of multiplier B216, that is, the multiplied value ($\Sigma A$)*Pm·$q_{SONIC}/\{\sqrt{(Ra \cdot Tm)}\}$ is further multiplied with an integral-interval time $\Delta t1$ (=$\Delta\theta/(6 \cdot Ne)$), so as to generate the further multiplied value ($\Sigma A$)·Pm·$q_{SONIC}/\{\sqrt{(Ra \cdot Tm)}\}\cdot \Delta t1$=($\Sigma A$)·Pm/$\{\sqrt{(Ra \cdot Tm)}\}\cdot q_{SONIC}\cdot \Delta t1$. In this manner, the sonic intake-air quantity $Q_D$ represented by the above-mentioned expression (11) can be calculated.

On the other hand, maximum intake-air quantity $Q_{MAX}$ is a cylinder intake-air quantity obtained when a cylinder stroke volume (simply, a stroke volume) from the beginning of intake stroke to the end of intake stroke is charged with air in an air-drawing state (upstream of intake valve 104) where air is drawn from the upstream side of intake valve 104 toward the engine cylinder. The maximum intake-air quantity $Q_{MAX}$ is calculated by the following expression (12).

$$Q_{MAX} = \frac{Pm}{(Ra \cdot Tm)} \cdot (VIVC - VTDC) \qquad (12)$$

where "VIVC" denotes a cylinder volume at intake valve closure timing IVC, and "VTDC" denotes a cylinder volume at a piston top dead center (TDC) position. When analyzing statically, as appreciated from the above expression (12), the subtracted value (VIVC−VTDC), obtained by subtracting the cylinder volume VTDC at TDC from the cylinder volume VIVC at IVC, corresponds to the stroke volume. However, more precisely it must be analyzed dynamically rather than statically. Actually, real top dead center TDCR is the actual intake-stroke starting point at which the intake stroke starts, and real intake valve closure timing IVCR is the actual intake-stroke termination point at which the intake stroke ends. For the reasons discussed above, in the system of the embodiment, as seen in the following expression (13), a cylinder volume VIVCR at real intake valve closure timing IVCR is used instead of using the intake-valve-closure-timing cylinder volume VIVC, and additionally a cylinder volume VTDCR at real top dead center TDCR is used instead of using the top-dead-center cylinder volume VTDC. Cylinder volume VIVCR at real intake valve closure timing IVCR is hereinafter referred to as "real IVC cylinder volume", whereas cylinder volume VTDCR at real top dead center TDCR is hereinafter referred to as "real TDC cylinder volume".

$$Q_{MAX} = \frac{Pm}{(Ra \cdot Tm)} \cdot (VIVCR - VTDCR) \quad (13)$$

Figure 13:
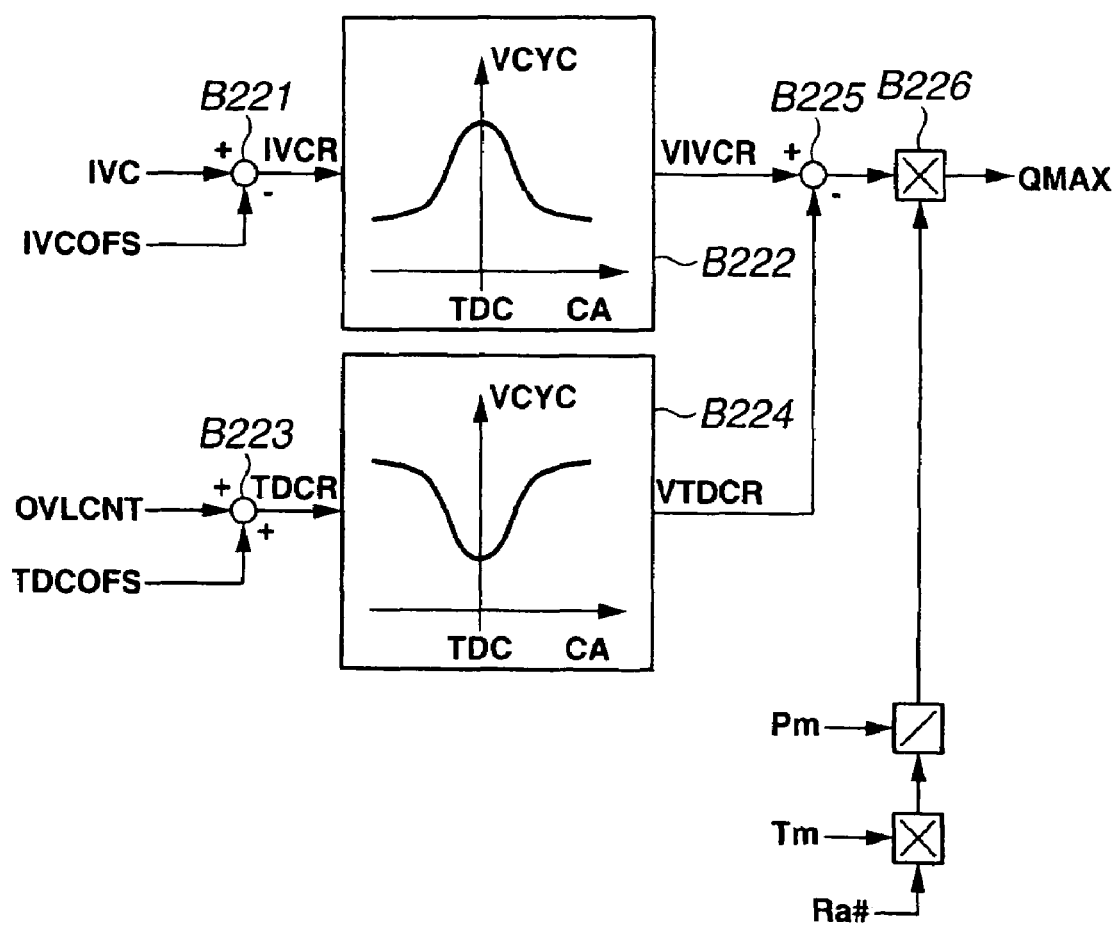
FIG. 13 is a block diagram showing arithmetic operations used to calculate a maximum intake-air quantity $Q_{MAX}$.
Figure 14:
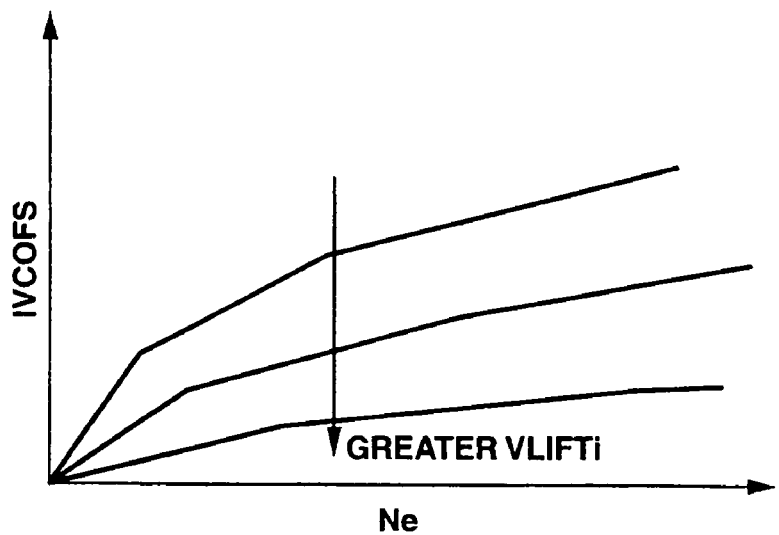
FIG. 14 is a preprogrammed intake-valve-closure-timing offset amount map used to retrieve or calculate an intake-valve-closure-timing offset amount IVCOFS based on the engine speed Ne and intake-valve lift amount VLIFTi.

Concretely, the previously-noted maximum intake-air quantity $Q_{MAX}$ is calculated by the arithmetic processing indicated by the block diagram of FIG. 13. As appreciated from the block diagram of FIG. 13, a real valve closure timing calculation section, simply a real IVC calculation section B221, calculates real intake valve closure timing IVCR by subtracting an intake-valve-closure-timing (IVC) offset amount IVCOFS from intake valve closure timing IVC. Hereupon, IVC offset amount IVCOFS is calculated or retrieved based on engine speed Ne and lift amount VLIFTi (e.g., a maximum intake-valve lift amount) of intake valve 104 from the preprogrammed Ne-VLIFTi-IVCOFS characteristic map as shown in FIG. 14. The IVC offset amount IVCOFS has a characteristic that IVC offset amount IVCOFS increases, as engine speed Ne increases and intake-valve lift amount VLIFTi decreases.

A real valve closure timing cylinder volume calculation section, simply a real IVC cylinder volume calculation section B222, calculates or retrieves real IVC cylinder volume VIVCR based on real intake valve closure timing IVCR from a predetermined cylinder volume VCYC table as drawn in the block corresponding to real IVC cylinder volume calculation section B222 in FIG. 13.

In the shown embodiment, within real IVC calculation section B221, real intake valve closure timing IVCR is calculated as the subtracted value (IVC−IVCOFS) obtained by subtracting IVC offset amount IVCOFS from the set intake valve closure timing IVC. A method to derive or calculate real intake valve closure timing IVCR is not limited to the particular method (i.e., subtraction of IVCOFS from IVC), but the system may utilize another method that can determine the actual intake-stroke termination point as real intake valve closure timing IVCR.

Within a real TDC calculation section B223, real top dead center TDCR is calculated as the sum (OVLCNT+TDCOFS) obtained by adding top-dead-center offset amount TDCOFS (see FIG. 11) to overlap central angle OVLCNT. Within a real TDC cylinder volume calculation section B224, real TDC cylinder volume VTDCR is calculated or retrieved based on real top dead center TDCR from a predetermined cylinder volume VCYC table as drawn in the block corresponding to real TDC cylinder volume calculation section B224 in FIG. 13.

In the shown embodiment, within real TDC calculation section B223, real top dead center TDCR is calculated as the summed value (OVLCNT+TDCOFS) obtained by adding TDC offset amount TDCOFS to overlap central angle OVLCNT. A method to derive or calculate real top dead center TDCR is not limited to the particular method (i.e., addition of TDCOFS to OVLCNT), but the system may utilize another method that can determine the actual intake-stroke starting point as real top dead center TDCR.

Within an effective stroke volume calculation section or a real stroke volume calculation section B225, a real stroke volume is calculated as the subtracted value (VIVCR−VTDCR) obtained by subtracting real TDC cylinder volume VTDCR from real IVC cylinder volume VIVCR. Within a multiplier B226, the divided value {Pm/(Ra·Tm)}, which is obtained by dividing intake pressure Pm by the product (Ra·Tm) of the gas constant Ra of air and intake air temperature Tm, is multiplied with the calculated real stroke volume (VIVCR−VTDCR) so as to generate the multiplied value {Pm/(Ra·Tm)}·(VIVCR−VTDCR). In this manner, the maximum intake-air quantity $Q_{MAX}$ represented by the above-mentioned expression (13) can be calculated.

On the assumption that the actual cylinder intake-air quantity achieved in accordance with the set operating characteristic of intake valve 104 is represented by the symbol "Qcyl", there is one-to-one correspondence between the ratio $(Q_D/Q_{MAX})$ of sonic intake-air quantity QD to maximum intake-air quantity $Q_{MAX}$ and the ratio $(Qcyl/Q_{MAX})$ of actual cylinder intake-air quantity Qcyl to maximum intake-air quantity $Q_{MAX}$. This univocal relation between the two ratios $(Q_D/Q_{MAX})$ and $(Qcyl/Q_{MAX})$ is assured by the inventors of the present invention. When a first ratio (for example, $Qcyl/Q_{MAX}$) of the two ratios $(Q_D/Q_{MAX})$ and $(Qcyl/Q_{MAX})$ has been calculated, it is possible to rapidly derive the second ratio (for example, $Q_D/Q_{MAX}$) by pre-memorizing the mutual relation between these ratios $(Q_D/Q_{MAX})$ and $(Qcyl/Q_{MAX})$. In other words, when a first one of the two ratios $(Q_D/Q_{MAX})$ and $(Qcyl/Q_{MAX})$ has been determined, it is possible to easily convert the first ratio (e.g., $Qcyl/Q_{MAX}$) into the second ratio (e.g., $Q_D/Q_{MAX}$), utilizing the pre-memorized mutual relation. In the shown embodiment, the mutual relation between the two ratios $(Q_D/Q_{MAX})$ and $(Qcyl/Q_{MAX})$ is pre-memorized in the form of the predetermined conversion table in converter B105 in FIG. 8. By virtue of the conversion table, the result of calculation of divider B104, that is, the divided value or the ratio $(tQcyl0/Q_{MAX})$ of target cylinder intake-air quantity tQcyl0 to maximum intake-air quantity $Q_{MAX}$, can be easily rapidly converted into the ratio $(Q_D/Q_{MAX})$ of sonic intake-air quantity (a target sonic intake-air quantity) QD to maximum intake-air quantity $Q_{MAX}$.

Returning to FIG. 8, within a multiplier B106, a target sonic intake-air quantity $tQ_D$ is calculated by multiplying the output value $(Q_D/Q_{MAX})$ generated from converter B105 with maximum intake-air quantity $Q_{MAX}$.

Sonic intake-air quantity $Q_D$ is represented by the previously-noted expression (11). Thus, it is possible to derive or calculate a target total opening area (tΣA) by dividing the previously-noted target sonic intake-air quantity $tQ_D$ by the value {Pm·$q_{SONIC}$/√(Ra·Tm)} within a divider B107, and by further dividing the divided value $tQ_D$/{Pm·$q_{SONIC}$/√(Ra·Tm)} by unit time Δt {=Δθ/(6×Ne)} within a divider B108. Therefore, the calculated target total opening area (tΣA) corresponds to a valve opening area needed to get the target sonic intake-air quantity $tQ_D$.

Within a target working angle setting section B109 in FIG. 8, the calculated target total opening area (tΣA) is converted into an equivalent value expressed in a unit of "crankangle", utilizing a predetermined (tΣA)-θevent lookup table as drawn in the block corresponding to target working angle setting section B109 in FIG. 8. As a result of conversion from the opening area (exactly, target total opening area (tΣA)) to a working angle, basic target working angle tθevent0 is obtained. As can be appreciated from the predetermined (tΣA)-θevent lookup table, basic target working angle tθevent0 is set as a greater value, as target total opening area (tΣA) increases.

Figure 15:
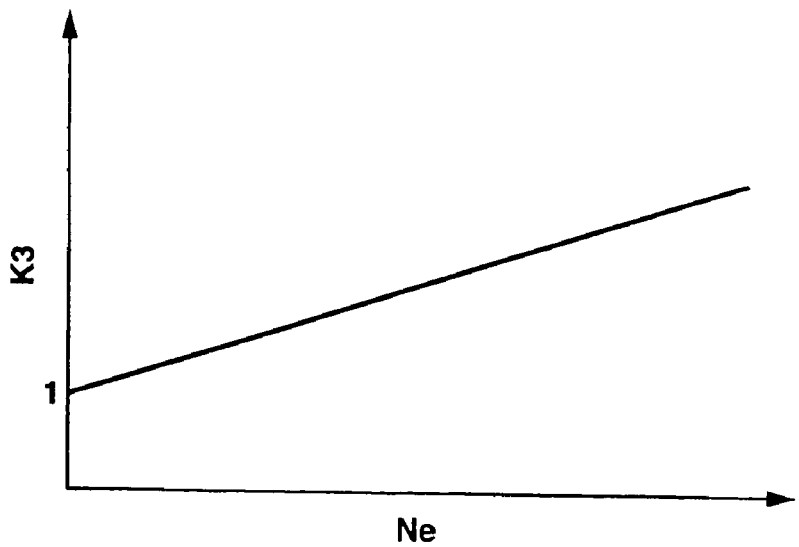
FIG. 15 shows one example of a preprogrammed lookup table used to set a coefficient K3.

Returning to the adder B103 in FIG. 8, target blow-back gas amount (target in-cylinder residual gas amount) $tQ_{IFB}$ added to the static component tQcyl1 of the target fresh-air quantity within adder B103, is set or determined depending on engine operating conditions. Assuming that the opening area of intake valve 104 during a valve overlap period is defined as an integrated value $(\Sigma A_{IV})$ of the intake-valve opening area (the first-half opening area) from intake valve open timing IVO to overlap central angle OVLCNT and the in-cylinder pressure is set as exhaust pressure Pe, a blow-back gas amount $Q_{IFB}$ can be represented by the following expression (14). In the expression (14), "K3" denotes a coefficient. As can be appreciated from the Ne-K3 lookup table as shown in FIG. 15, the coefficient K3 is greater than or equal to "1" and preprogrammed to be in direct proportion to engine speed Ne.

$$Q_{IFB} = (\Sigma A_{IV}) \cdot \frac{Pe}{\sqrt{Ra \cdot Te}} \cdot V_0 \cdot \Delta t \cdot K3 \qquad (14)$$

where $$V_0 = \sqrt{\frac{2\kappa}{\kappa - 1} \cdot \left\{ \left(\frac{Pm}{Pe}\right)^{\frac{2}{\kappa}} - \left(\frac{Pm}{Pe}\right)^{\frac{\kappa+1}{\kappa}} \right\}}$$

Therefore, it is possible to calculate or derive a valve-overlap-period target opening area $(t\Sigma A_{IV})$ (hereinafter is referred to as "target OVL first-half opening area") from the above expression (14). The target OVL first-half opening area $(t\Sigma A_{IV})$ corresponds to a target value of the integrated value $(\Sigma A_{IV})$ of the intake-valve opening area (the first-half opening area) from intake valve open timing IVO to overlap central angle OVLCNT.

In the system of the embodiment, exhaust valve 108 is operated in accordance with the fixed valve operating characteristic that the working angle (the lift amount and the lifted period, in other words, the valve open period) and the phase of exhaust valve 108 are both fixed. Thus, when the previously-noted target OVL first-half opening area $(t\Sigma A_{IV})$ and basic target working angle tθevent0 have been calculated or determined, valve open timing IVO of intake valve 104 can be determined. Thus, within a target valve open timing setting section B110 in FIG. 8, basic target intake-valve-open timing (simply, basic target open timing) tIVO0 is set or determined or retrieved based on basic target working angle tθevent0 and target OVL first-half opening area $(t\Sigma A_{IV})$, from a predetermined map as drawn in the block corresponding to target valve open timing setting section B110 in FIG. 8.

Basic target working angle tθevent0 and basic target open timing tIVO0 are output from target working angle setting section B109 and target valve open timing setting section B110 to switching output section B14 of FIG. 6.

The system of the embodiment can provide the following effects.

According to the system of the embodiment, in a predetermined high-load range (see the hatching area in FIG. 4), a predetermined high-load operating characteristic (preferably, a predetermined full-load period operating characteristic) is set as a target operating characteristic of intake valve 104. In an engine operating range except the predetermined high-load range, the target operating characteristic of intake valve 104 is set or calculated or determined based on a cylinder intake-air quantity (tQcyl) corresponding to a target engine torque (tTe). Therefore, it is possible to switch to a high-load period control mode (the high-load period operating characteristic) without reference to the target engine torque (in other words, the target cylinder intake-air quantity) in the predetermined high-load range (in particular, during full-load operation or during WOT operation), while executing, as a basic control mode, a so-called "torque-demand control" that the target operating characteristic of intake valve 104 is controlled or determined based on the target engine torque. Thus, it is possible to effectively suppress or eliminate undesirable fluctuations (or undesirable reduction) in engine power output, occurring due to disturbance signals, such as intake-air-temperature variations occurring owing to intake-air flow pulsations and intake-pressure fluctuations occurring owing to the intake-air flow pulsations. Even in the high-load range (even during WOT operation), it is possible to easily certainly produce the desired engine power output. This insures an engine power output performance. In other words, it is possible to ensure the maximum power output of engine 1 in the high-load range (in particular during full-load operation). The decision of the predetermined high-load range can be made by way of the preprogrammed high-load range lookup table shown in FIG. 4. Alternatively, the decision of the predetermined high-load range can be made based on the detected accelerator opening APO. The decision of the predetermined high-load range based on the detected accelerator opening APO is superior to that based on the preprogrammed lookup table, in simplified control system.

As previously described, as the high-load period valve operating characteristic, the system of the embodiment uses a "full-load period valve operating characteristic" preset to be suitable for the full-load operation (WOT power enrichment operation) of engine 1. In lieu thereof, the high-load range may be subdivided into a plurality of high-load ranges (for example, a full-load operation, $1^{st}$ high-load range, $2^{nd}$ high-load range, $3^{rd}$ high-load range, . . . ). In this case, a full-load period valve operating characteristic suited to the full-load operation, a first operating characteristic suited to the $1^{st}$ high-load range, a second operating characteristic suited to the $2^{nd}$ high-load range, a third operating characteristic suited to the $3^{rd}$ high-load range, . . . have to be preprogrammed and pre-memorized. The setting of the subdivided high-load ranges is superior in high-precision intake-air quantity control.

In the system of the embodiment, the univocal relation between the ratio $(Q_D/Q_{MAX})$ of sonic intake-air quantity QD to maximum intake-air quantity $Q_{MAX}$ and the ratio $(Qcyl/Q_{MAX})$ of actual cylinder intake-air quantity Qcyl to maximum intake-air quantity $Q_{MAX}$ is pre-memorized in the form of the conversion table (see converter B105 in FIG. 8). Target sonic intake-air quantity $tQ_D$ is calculated based on the pre-memorized $(Q_D/Q_{MAX})$–$(Qcyl/Q_{MAX})$ conversion table and target cylinder intake-air quantity tQcyl0 (see the blocks B105-B106 in FIG. 8). A basic target operating characteristic (i.e., basic target working angle tθevent0 and basic target intake-valve-open timing tIVO0) of intake valve 104 is calculated or determined based on the calculated target sonic intake-air quantity $tQ_D$. More concretely, an intake-valve opening area needed to introduce the target sonic intake-air quantity $tQ_D$ via intake port 101a into the cylinder as a sonic airflow, that is, a target total opening area (tΣA) is calculated based on the calculated target sonic intake-air quantity tQD (see the block B108 in FIG. 8). The opening area (tΣA) is converted into a target working angle (i.e., basic target working angle tθevent0), utilizing a predetermined (tΣA)-θevent conversion table (see the block B109 in FIG. 8). Then, the target open timing (i.e., basic target open timing tIVO0) is produced based on the target working angle (i.e., basic target working angle tθevent0) and target OVL first-half opening area (tΣA$_{IV}$) corresponding to a target value of the integrated value (ΣA$_{IV}$) of the first-half opening area from intake valve open timing IVO to overlap central angle OVLCNT (see the block B110 in FIG. 8). Thus, through all engine operating ranges, it is possible to easily set a target intake-valve operating characteristic (i.e., a basic target operating characteristic of intake valve 104) by using the conversion tables without overusing characteristic maps. Thus, it is possible to achieve the cylinder intake-air quantity (i.e., target fresh-air quantity tQcyl) corresponding to target engine torque tTe, while realizing reduced load on computation and shortened operating time (enhanced control system response).

The entire contents of Japanese Patent Application No. 2006-076866 (filed Mar. 20, 2006) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An intake-air quantity control system of an engine employing a variable valve operating device capable of controlling a cylinder intake-air quantity by variable control of an operating characteristic of an intake valve, comprising:
 a first target operating characteristic setting device configured to set a high-load period valve operating characteristic, preset to be suitable for the predetermined high-load range, as a target operating characteristic of the intake valve, in a predetermined high-load range; and
 a second target operating characteristic setting device configured to calculate a cylinder intake-air quantity corresponding to a target torque of the engine as a target intake-air quantity, and to set the target operating characteristic based on the calculated target intake-air quantity, in an engine operating range except the predetermined high-load range.

2. The intake-air quantity control system as claimed in claim 1, wherein:
 the first target operating characteristic setting device sets the high-load period valve operating characteristic to the target operating characteristic, when an accelerator opening exceeds a predetermined threshold value.

3. The intake-air quantity control system as claimed in claim 1, wherein:
 the first target operating characteristic setting device sets the high-load period valve operating characteristic to the target operating characteristic, in presence of a demand for full-load operation.

4. The intake-air quantity control system as claimed in claim 1, wherein:
 the high-load period valve operating characteristic is a full-load period valve operating characteristic, preset to be suitable for full-load operation.

5. The intake-air quantity control system as claimed in claim 1, wherein:
 assuming that a sonic intake-air quantity $Q_D$ is a cylinder intake-air quantity obtained in a sonic-flow state where air is drawn into a cylinder as a sonic flow with an opening area of the intake valve corresponding to the operating characteristic of the intake valve, a maximum intake-air quantity $Q_{MAX}$ is a cylinder intake-air quantity obtained when a cylinder stroke volume from a starting point of an intake stroke to a termination point of the intake stroke is charged with air in an air-drawing state where air is drawn from an upstream side of the intake valve toward the cylinder, and an actual cylinder intake-air quantity is represented by a symbol Qcyl, the second target operating characteristic setting device calculates a target sonic intake-air quantity corresponding to the calculated target intake-air quantity based on the calculated target intake-air quantity and a predetermined relation between a ratio $Q_D/Q_{MAX}$ of the sonic intake-air quantity $Q_D$ to the maximum intake-air quantity $Q_{MAX}$ and a ratio $Qcyl/Q_{MAX}$ of the actual cylinder intake-air quantity Qcyl to the maximum intake-air quantity $Q_{MAX}$, and sets the target operating characteristic based on the calculated target sonic intake-air quantity.

6. The intake-air quantity control system as claimed in claim 5, wherein:
 the second target operating characteristic setting device calculates, based on the calculated target sonic intake-air quantity, an opening area of the intake valve needed to achieve the target sonic intake-air quantity, and sets the target operating characteristic based on the calculated opening area of the intake valve.

7. An intake-air quantity control system of an engine employing a variable valve operating device capable of controlling a cylinder intake-air quantity by variable control of an operating characteristic of an intake valve, comprising:
 a basic target operating characteristic setting device configured to calculate a cylinder intake-air quantity corresponding to a target torque of the engine as a target intake-air quantity, and to set a target operating characteristic based on the calculated target intake-air quantity; and
 a full-load period target operating characteristic setting device configured to set a full-load period valve operating characteristic, preset to be suitable for full-load operation, as the target operating characteristic of the intake valve regardless of the target intake-air quantity, in presence of a demand for the full-load operation.

8. An intake-air quantity control system of an engine employing a variable valve operating device capable of controlling a cylinder intake-air quantity by variable control of an operating characteristic of an intake valve, comprising:
 a basic target operating characteristic setting device configured to calculate a cylinder intake-air quantity corresponding to a target torque of the engine as a target intake-air quantity, and to calculate a basic operating characteristic based on the calculated target intake-air quantity, and to set the basic operating characteristic as a target operating characteristic of the intake valve, in an engine operating range except a predetermined high-load range; and
 a high-load period target operating characteristic setting device configured to set a high-load period valve operating characteristic, preset to be suitable for the predetermined high-load range, as the target operating characteristic of the intake valve, in the predetermined high-load range.

9. An intake-air quantity control system of an engine employing a variable valve operating device capable of controlling a cylinder intake-air quantity by variable control of an operating characteristic of an intake valve, comprising:

first target operating characteristic setting means for setting a high-load period valve operating characteristic, preset to be suitable for the predetermined high-load range, as a target operating characteristic of the intake valve, in a predetermined high-load range; and second target operating characteristic setting means for calculating a cylinder intake-air quantity corresponding to a target torque of the engine as a target intake-air quantity, and for setting the target operating characteristic based on the calculated target intake-air quantity, in an engine operating range except the predetermined high-load range.

10. An intake-air quantity control system of an engine employing a variable valve operating device capable of controlling a cylinder intake-air quantity by variable control of an operating characteristic of an intake valve, comprising:

basic target operating characteristic setting means for calculating a cylinder intake-air quantity corresponding to a target torque of the engine as a target intake-air quantity, and for setting a target operating characteristic based on the calculated target intake-air quantity; and full-load period target operating characteristic setting means for setting a full-load period valve operating characteristic, preset to be suitable for full-load operation, as the target operating characteristic of the intake valve regardless of the target intake-air quantity, in presence of a demand for the full-load operation.

\* \* \* \* \*